(12) United States Patent
Katoh et al.

(10) Patent No.: US 8,654,266 B2
(45) Date of Patent: Feb. 18, 2014

(54) OPTICAL SENSOR AND DISPLAY DEVICE PROVIDED WITH SAME

(75) Inventors: Hiromi Katoh, Osaka (JP); Kohei Tanaka, Osaka (JP); Christopher Brown, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 192 days.

(21) Appl. No.: 13/203,687

(22) PCT Filed: Oct. 16, 2009

(86) PCT No.: PCT/JP2009/067911
§ 371 (c)(1),
(2), (4) Date: Sep. 8, 2011

(87) PCT Pub. No.: WO2010/097984
PCT Pub. Date: Sep. 2, 2010

(65) Prior Publication Data
US 2012/0002149 A1  Jan. 5, 2012

(30) Foreign Application Priority Data
Feb. 27, 2009  (JP) .................................. 2009-046954

(51) Int. Cl.
*G02F 1/1335* (2006.01)
(52) U.S. Cl.
USPC .......................................................... 349/12
(58) Field of Classification Search
USPC .......................................................... 349/12
See application file for complete search history.

(56) References Cited

U.S. PATENT DOCUMENTS

2002/0043613 A1   4/2002   Suzuki et al.
2008/0073490 A1   3/2008   Koide

FOREIGN PATENT DOCUMENTS

| JP | 57-058108 A | 4/1982 |
| JP | 08-330621 A | 12/1996 |
| JP | 2002-176192 A | 6/2002 |
| JP | 2002-231993 A | 8/2002 |
| JP | 2006-3857 A | 1/2006 |
| JP | 2007-18458 A | 1/2007 |
| JP | 2008-076344 A | 4/2008 |

OTHER PUBLICATIONS

International Search Report (ISR) issued in PCT/JP2009/067911 (International application) mailed in Jan. 2010 for Examiner consideration.

*Primary Examiner* — Phu Vu
(74) *Attorney, Agent, or Firm* — Chen Yoshimura LLP (57) ABSTRACT

An optical sensor is provided with a photodiode (D1) which receives light in a first range, including light to be detected, and a photodiode (D2) which receives light in a second range other than the light to be detected. For instance, the photodiode (D1) receives light at all the incident angles, and the photodiode (D2) has a light blocking film on an incident light path so as to selectively receive only the incident light from the oblique directions. The differential between the output from the photodiode (D1) and that from the photodiode (D2) is read out as sensor output.

10 Claims, 10 Drawing Sheets

OPTICAL SENSOR AND DISPLAY DEVICE PROVIDED WITH SAME

TECHNICAL FIELD

The present invention relates to a display device with an optical sensor having a light detecting element, such as a photodiode, a phototransistor or the like, and more particularly, to a display device having an optical sensor in a pixel region.

BACKGROUND ART

Previously, for example, by having a light detecting element such as a photodiode or the like in a pixel, a display device with an optical sensor, which is capable of detecting brightness of outside light and capturing an image of an object near the display, has been proposed. It is contemplated that such a display device with the optical sensor is used as a bi-directional communication display device, or as a display device with a touch panel function.

In a conventional display device with an optical sensor, when known constituting elements, such as a signal line, a scan line, a TFT (Thin Film Transistor), a pixel electrode and the like, are formed by a semiconductor process on an active matrix substrate, at the same time, a photodiode and the like are formed on the active matrix substrate (for example, see Patent Document 1).

There is a temperature dependence in a light detecting element, such as a photodiode and the like. In order to compensate for changes in characteristics of the element due to a change in an ambient temperature, a configuration in which a light detecting element for reference is provided in addition to the light detecting element for detecting brightness has been known (for example, see Patent Document 2). The configuration, as disclosed in Patent Document 2, has a light blocking area covered by a light blocking film in a part of a pixel region, and compensates a light signal read out from the light detecting element formed in a display area not covered by the light blocking film, with an output of the light detecting element in the light blocking area. By this, a sensor output, which is compensated for a change in a dark current accompanying the ambient temperature change and which therefor is not subject to the temperature change, can be obtained.

RELATED ART DOCUMENTS

Patent Documents

Patent Document 1: Japanese Patent Application Laid-Open Publication No. 2006-3857
Patent Document 2: Japanese Patent Application Laid-Open Publication No. 2007-18458

SUMMARY OF THE INVENTION

Problems to be Solved by the Invention

The conventional light detecting element for reference, as described above, has a structure in which its entire surface is covered with the light blocking film, and external light cannot come in at all. On the other hand, with respect to the light detecting element formed in the display area not covered by the light blocking film, in addition to light to be received (the light to be detected), unnecessary light also enters. Here, the unnecessary light is, for example, a stray light component coming in at oblique angles, the light in a wavelength range other than the wavelength of the light to be received, or the like. Thus, the unnecessary light detected by the light detecting element cannot be compensated by a conventional light detecting element for reference, which detects only the dark current.

In view of the above problems, the present invention aims to provide an optical sensor capable of obtaining a high accuracy sensor output, and a display device having the same, by suppressing noise due to unnecessary light, which is light other than the light to be detected.

Means for Solving the Problems

In order to solve the above problems, an optical sensor according to the present invention has a first light detecting element receiving light in a first range including light to be detected, and a second light detecting element receiving light in a second range other than the light to be detected, wherein the differential between an output of the first light detecting element and an output of the second light detecting element is a sensor output.

Effects of the Invention

According to the present invention, an optical sensor capable of obtaining a highly accurate sensor output and a display device having the same can be provided by suppressing noise due to unnecessary light, which is light other than the light to be detected.

DETAILED DESCRIPTION OF EMBODIMENTS

An optical sensor in an embodiment of the present invention has a first light detecting element, which receives light in a first range including light to be detected, and a second light detecting element, which receives light in a second range other than the light to be detected, and is configured so that the differential between an output of the first light detecting element and that of the second light detecting element is outputted as a sensor output (first configuration). With this configuration, by suppressing noise due to unnecessary light other than the light to be detected, an optical sensor capable of producing a highly accurate sensor output can be realized.

In the above described sensor, the second range is preferably a subset of the first range (second configuration).

As a specific example of the second configuration, for instance, there is a configuration in which the first light detecting element receives light in the first range of wavelengths, and the second light detecting element receives light in the second range of wavelengths included in the first range of the wavelengths (third configuration). Here, the first range may not necessarily be a continuous wavelength range. Similarly, the second range may not necessarily be a continuous wavelength range.

For instance, as a further specific example of the third configuration, a green filter is disposed in an incident light path to the first light detecting element, and an infrared transmission filter is disposed in an incident light path to the second light detecting element (fourth configuration). According to the fourth configuration, since the green filter allows a green wavelength range and an infrared wavelength range to transmit through, the first light detecting element receives light in the green wavelength range and in the infrared wavelength range. The second light detecting element selectively receives light in the infrared wavelength range, because the infrared transmission filter is disposed in the incident light path. Thus, the differential between the output of the first light detecting element and the output of the second light detecting element is a component of the green wavelength range received by the first light detecting element. Accordingly, it is possible to realize an optical sensor that detects with high sensitivity a component in the green wavelength range, which is most discernable to the humans.

Also, in another specific example of the second configuration, for instance, the first light detecting element receives light in the first range of incident angles, and the second light detecting element receives light in the second range of incident angles included in the first range of the incident angles (fifth configuration). Here, in the fifth configuration also, the first range may not necessarily be a continuous angle range. Similarly, the second range may not necessarily be a continuous angle range.

In a further specific example of the fifth configuration, for example, the first light detecting element receives light at all the incident angles, and a light blocking film is provided in the incident light path to the second light detecting element in order to prevent light to be detected from entering a light detecting region of the second light detecting element (sixth configuration). According to the sixth configuration, the first light detecting element receives light of all the incident light, and the second light detecting element receives only stray light, which is other than the light to be detected. Thus, the differential between the output of the first light detecting element and the output of the second light detecting element is the component of the light to be detected received by the first light detecting element. As described above, an optical sensor, which detects with a high sensitivity the component of the incoming light to be detected at a predetermined range of incident angles, can be realized.

Also, in another specific example of the fifth configuration, for instance, a light blocking film is provided in the incident light path to the first light detecting element to selectively expose the light detecting region of the first light detecting element, and a light blocking film is provided in the incident light path to the second light detecting element to prevent light to be detected from entering the light detecting region of the second light detecting element (seventh configuration).

Further, in the first to seventh configurations, it is preferable that the first light detecting element and the second light detecting element are connected to each other in series, and a potential at the connection point is outputted as the sensor output (eighth configuration). According to the eighth configuration, because the potential of the connection point between the first light detecting element and the second light detecting element can be read out directly as the optical sensor output, the circuit configuration of the optical sensor can be simplified.

Alternately, in the first to seventh configurations, it is also preferable that the first light detecting element is connected to the second light detecting element in parallel, and a circuit is provided to find the differential between the output of the first light detecting element and the output of the second light detecting element (ninth configuration).

Also, the present invention can be embodied as a display device having the optical sensor of to any one of the first to ninth configurations described above. Specifically, this display device may also be configured so that it has a plurality of pixels formed on an active matrix substrate, and the optical sensor is provided on the active matrix substrate in the region where the pixels are formed, or the optical sensor is provided on the active matrix substrate outside of the region where the pixels are formed. Although not limiting, preferably, the liquid crystal display device further has an opposite substrate facing the active matrix substrate and has liquid crystal sandwiched between the active matrix substrate and the opposite substrate.

Below, specific embodiments of the present invention are described with reference to the drawings. Here, the following embodiments show configuration examples for embodying the display device of the present invention as a liquid crystal display device. However, the display device of the present invention is not limited to a liquid crystal display device, but also can be applied to any display device using an active matrix substrate. Here, because the optical sensor is included, it is contemplated that the display device of the present invention is used as a display device equipped with a touch panel, which performs input operations by detecting an object approaching the screen, or as a bi-directional communication display device equipped with a display function and an imaging function.

Also, for convenience of explanation, each of the drawings referred to below only shows, in a simplified manner, primary members necessary for describing the present invention among the constituting members of the embodiments of the present invention. Therefore, the display device of the present invention possibly includes appropriate constituting members not shown in each of the drawings referred to by the present specification. Also, the dimensions of the members in each of the drawings do not accurately represent the actual dimensions of the constituting members, or the ratios and the like of the dimensions of the respective members.

Embodiment 1

Figure 1:
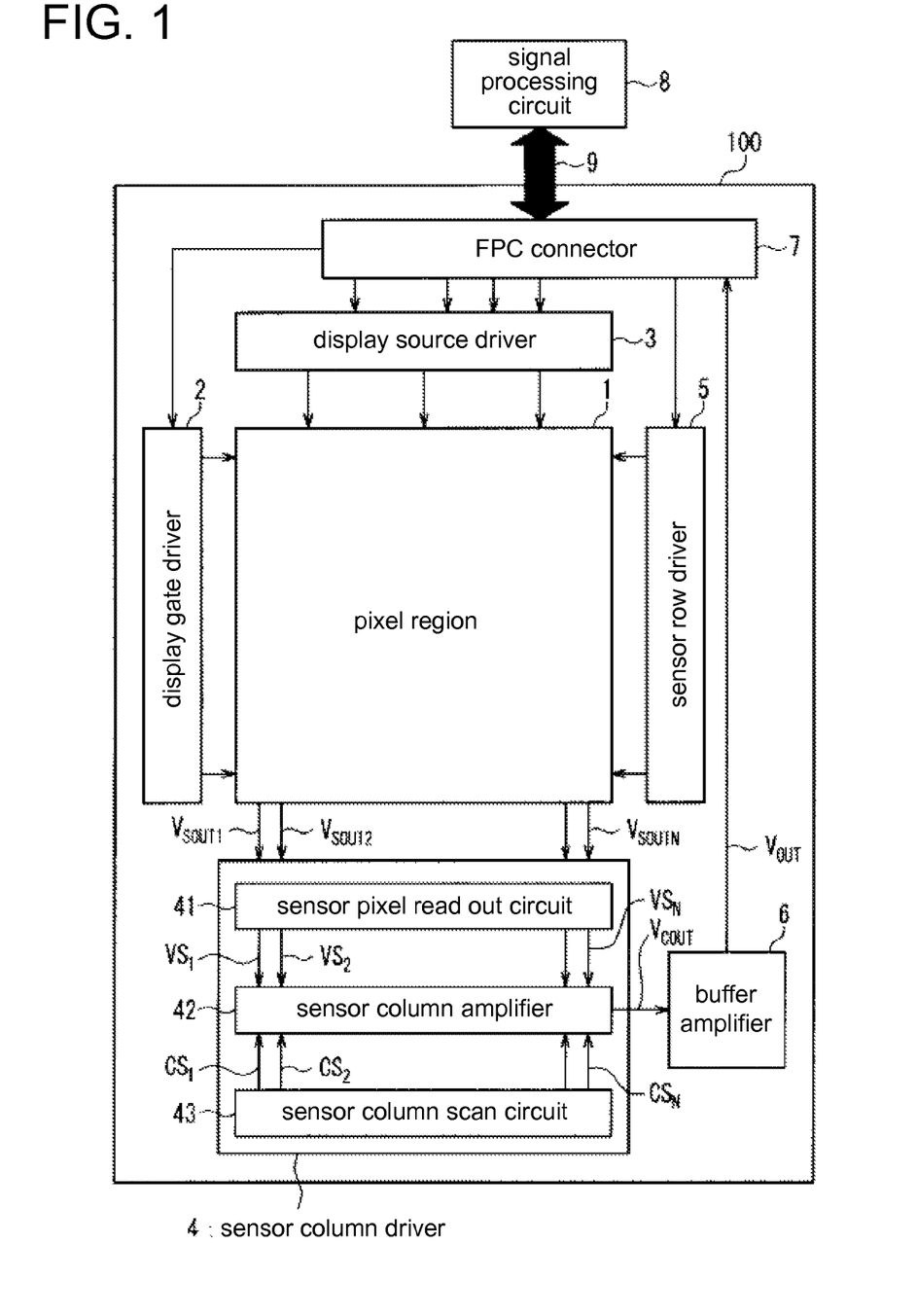
FIG. 1 is a block diagram showing a schematic configuration of a display device according to Embodiment 1 of the present invention.
Figure 2:
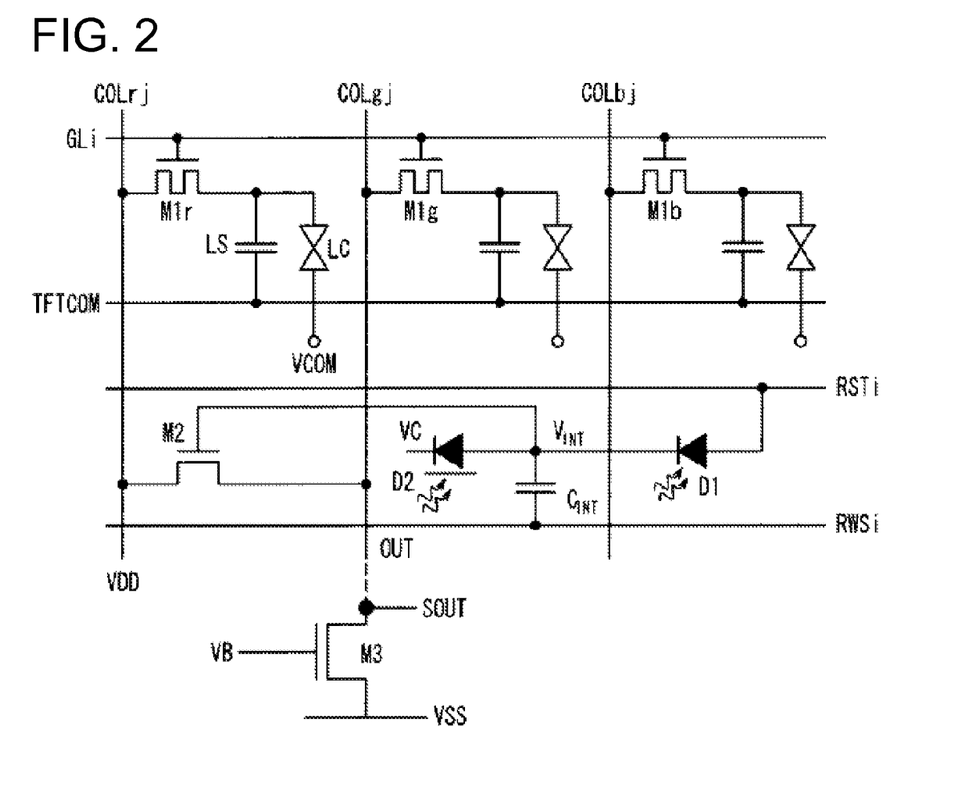
FIG. 2 is an equivalent circuit diagram showing a configuration of one pixel in the display device according to Embodiment 1 of the present invention.

Referring to FIG. 1 and FIG. 2, a schematic configuration of an active matrix substrate provided in a liquid crystal display device according to Embodiment 1 of the present invention is described first.

FIG. 1 is a block diagram showing a configuration of an active matrix substrate 100 provided in a liquid crystal display device according to an embodiment of the present invention. As shown in FIG. 1, the active matrix substrate 100 at least has a pixel region 1, a display gate driver 2, a display source driver 3, a sensor column (column) driver 4, a sensor row (row) driver 5, a buffer amplifier 6, and an FPC connector 7. Also, a signal processing circuit 8 for processing an image signal captured by a light detecting element (described below) in the pixel region 1 is connected to the active matrix substrate 100 through the FPC connector 7 and an FPC 9.

Here, the constituting members on the active matrix substrate 100 can also be formed monolithically on a glass substrate by semiconductor process. Alternatively, the amplifiers, the drivers, and the like among the constituting members may be mounted on the glass substrate by the COG (Chip On Glass) technique or the like, for example. Or, it is also conceivable that at least a part of the constituting members shown on the active matrix substrate 100 in FIG. 1 is mounted on the FPC 9. The active matrix substrate 100 is attached to an opposite substrate (not shown) having an opposite electrode formed on its entire surface, and a liquid crystal material is encapsulated in a gap between them.

The pixel region 1 is a region in which a plurality of pixels are formed for displaying an image. An optical sensor for capturing an image is provided in each pixel in the pixel region 1 in the present embodiment. FIG. 2 is an equivalent circuit diagram showing an arrangement of the pixel and the optical sensor in the pixel region 1 on the active matrix substrate 100. In the example of FIG. 2, one pixel is formed by picture elements of three colors R (red), G (green), and B (blue). In the pixel constituted by these three picture elements, one optical sensor, which is constituted by two photodiodes D1, D2, a capacitor $C_{INT}$, and a thin film transistor M2, is provided. The pixel region 1 has the pixels arranged in a matrix of M rows and N columns, and the optical sensors arranged likewise in a matrix of M rows and N columns. Here, as described above, the number of picture elements is M times 3N.

Therefore, as shown in FIG. 2, the pixel region 1 has gate lines GL and source lines COL disposed in a matrix manner for the wiring of the pixels. The gate lines GL are connected to the display gate driver 2. The source lines COL are connected to the display source driver 3. Here, the gate lines GL are provided in M rows in the pixel region 1. Below, if it is necessary to describe each individual gate line GL separately, it is expressed as GLi (i=1-M). On the other hand, the source lines COL are, as described above, provided as three lines per one pixel for supplying the image data to each of the three picture elements in one pixel. If the source lines COL each are to be described separately, it is expressed as COLrj, COLgj, COLbj (j=1-N).

In an intersection point of the gate line GL and the source line COL, a thin film transistor (TFT) M1 is provided as a switching element for the pixel. Here, in FIG. 2, the thin film transistors M1 provided in respective picture elements of red, green and blue are expressed as M1r, M1g, and M1b. A gate electrode, a source electrode, and a drain electrode of the thin film transistor M1 are connected to the gate line GL, the source line COL, and a pixel electrode (not shown), respectively. Because of this, as shown in FIG. 2, a liquid crystal capacitance LC is formed between the drain electrode of the thin film transistor M1 and the opposite electrode (VCOM). Also, an auxiliary capacitance LS is formed between the drain electrode and TFTCOM.

In FIG. 2, the picture element driven by the thin film transistor M1r connected to the intersection point of one gate line GLi and one source line COLrj is provided with a red color filter corresponding to that picture element, and by receiving red image data from the display source driver 3 through the source line COLrj, the picture element functions as a red picture element. Also, the picture element driven by the thin film transistor M1g connected to the intersection point of the gate line GLi and the source line COLgj is provided with a green color filter corresponding to that picture element, and by receiving green image data from the display source driver 3 through the source line COLgj, the picture element functions as a green picture element. Further, the picture element driven by the thin film transistor M1b connected to the intersection point of the gate line GLi and the source line COLbj is provided with a blue color filter corresponding to that picture element, and by receiving blue image data from the display source driver 3 through the source line COLbj, the picture element functions as a blue picture element.

Here, in the example of FIG. 2, the optical sensor is provided with a ratio of one per one pixel (three picture elements) in the pixel region 1. However, the arrangement ratio of the pixels and the optical sensors is not limited to this example. It can be any ratio. For example, one sensor may be arranged for one picture element, or one sensor may be arranged for a plurality of pixels.

As shown in FIG. 2, the optical sensor has a photodiode D1 (first light detecting element) for detecting light, a capacitor $C_{INT}$, a thin film transistor M2, and a photodiode D2 (second light detecting element) for reference. The photodiodes D1, D2 are optimized in the circuit characteristics or device characteristics so that output currents when the photodiodes are not illuminated with light are equal. The I-V characteristic (reverse bias region) of a photodiode does not depend on an applied voltage. Thus, ideally, if the sizes (the length L and the width W of a semiconductor layer functioning as a light detecting region) of the photodiodes D1, D2 are the same, and further if a signal that maintains a reverse bias at the photodiode D2 is inputted into a reference voltage line VC, the dark currents become equal. However, in reality, there exists a slight applied voltage dependence of the I-V characteristics. Therefore, it is preferable to vary the voltage applied to the reference voltage line VC to adjust the dark currents of the photodiodes D1, D2 to be equal to each other. Here, for the photodiodes D1, D2, for example, a lateral structure or laminated structure PN junction or PIN junction diode can be used. In this case, as described above, it is preferable that two photodiodes having the same length and width, respectively, in the boundary region between a p layer and an n layer (that is, the semiconductor layer functioning as the light detecting region) are used as the photodiodes D1, D2. With this preferred configuration, although there may be a slight difference due to self-parasitic capacitances, the output currents of the photodiodes D1, D2 can be made to be nearly equal when the photodiodes are not illuminated with light.

Figure 3A:
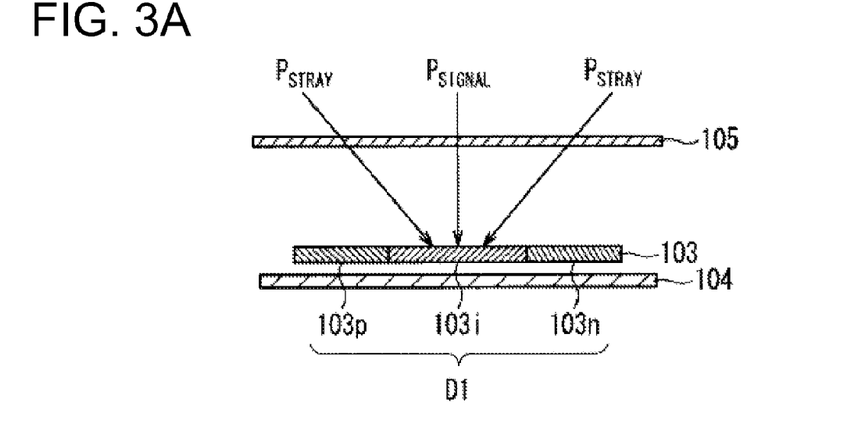
FIG. 3A is a schematic cross sectional view showing a schematic configuration of a photodiode for detecting light and a condition of incoming light according to Embodiment 1 of the present invention.
Figure 3B:
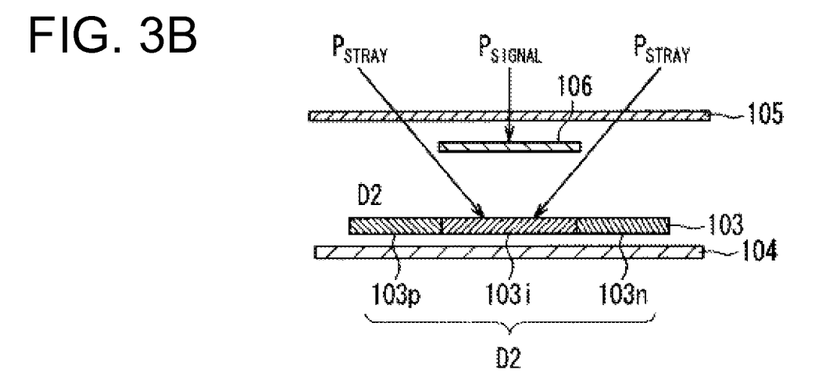
FIG. 3B is a schematic cross sectional view showing a schematic configuration of a photodiode for reference and the condition of incoming light according to Embodiment 1 of the present invention.

Here, an example of a specific configuration of the photodiodes D1, D2 is described by referring to FIG. 3A and FIG. 3B. FIG. 3A is a schematic cross sectional view of a configuration of the photodiode D1 for detecting light and a condition of incoming light. FIG. 3B is a schematic cross sectional view showing a configuration of the photodiode D2 for reference and a condition of incoming light. Here, FIG. 3A and FIG. 3B are schematic views and they do not show actual cross sectional structures. In reality, insulating layers and the like are appropriately provided between the respective layers.

As shown in FIG. 3A, the photodiode D1 is a PIN diode in which an n type semiconductor region 103n (n layer), an intrinsic semiconductor region 103i (i layer), and a p type semiconductor region 103p (p layer) are structured in this order along the planar direction of a silicon film 103. A rear light blocking film 104 is provided on a rear surface (opposite to the light receiving surface) of the photodiode D1. The rear light blocking film 104 prevents backlight light from coming into the photodiode D1. Also, in the example as shown in FIG. 3A, an infrared removal filter 105 for removing infrared light is provided on a front surface (on the side the light to be detected is coming in) of the photodiode D1. Here, the infrared removal filter 105 is effective in increasing detection accuracy when the light to be detected is visible light. However, this is not a configuration critical to embody the present invention. Also, if a light source of the light to be detected is an infrared light source, instead of using the infrared removal filter 105, it is preferable to use an infrared transmission filter, which selectively transmits infrared light.

The silicon film 103 is formed on an insulating film (not shown) covering the rear light blocking film 104, and is insulated electrically from the rear light blocking film 104. The intrinsic semiconductor region 103i of the silicon film 103 becomes the light detecting region. The intrinsic semiconductor region 103i is preferably a region having no impurities at all, or a region in which the conduction electron density and the hole density are equal. However, it is not necessarily limited to this. For example, the intrinsic semiconductor region 103i may be an electrically near neutral region in comparison with the neighboring n type semiconductor region 103n and the p type semiconductor region 103p. If the n type semiconductor region 103n is an n+ region, the intrinsic semiconductor region 103i may be an n-region having a lower diffusion density of n type impurities than the n+ region. If the p type semiconductor region 103p is a p+ region, the intrinsic semiconductor region 103i may be a p-region having a lower diffusion density of p type impurities than the p+ region.

In the present embodiment, type of silicon constituting the silicon film 103 is not particularly limited. However, from the perspective of the mobility of an electric charge, the silicon film 103 is preferably formed from continuous grain silicon or low temperature polysilicon. Also, the silicon film 103 is preferably formed using a forming step of the thin film transistor M2.

The photodiode D2, as shown in FIG. 3B, is also a PIN diode in which an n type semiconductor region 103n, an intrinsic semiconductor region 103i, and a p type semiconductor region 103p are structured in this order along the planar direction of the silicon film 103 that is common to the photodiode D1. A rear light blocking film 104 provided on the rear surface of the photodiode D1 is extended so as to be provided also on the rear surface of the photodiode D2. The infrared removal filter 105 provided on the front surface of the photodiode D1 is extended so as to be provided on the front surface of the photodiode D2.

A front light blocking film 106 is provided so as to cover the intrinsic semiconductor region 103i on the front surface of the photodiode D2. As shown in FIG. 3B, it is preferable that the size and the position of the front light blocking film 106 be designed so that light (the light to be detected) $P_{SIGNAL}$ coming in from a front direction with respect to the intrinsic semiconductor region 103i is blocked, but light (stray light) $P_{STRAY}$ coming in at oblique angles can reach the intrinsic semiconductor region 103i. Therefore, for example, it is preferable that the size of the front light blocking film 106 be slightly larger than the width and the length of the intrinsic semiconductor region 103i. For example, if the length Li of the intrinsic semiconductor region 103i is 6 μm, the length $L_{LS}$ of the front light blocking film 106 may be about 10 μm.

Figure 4:
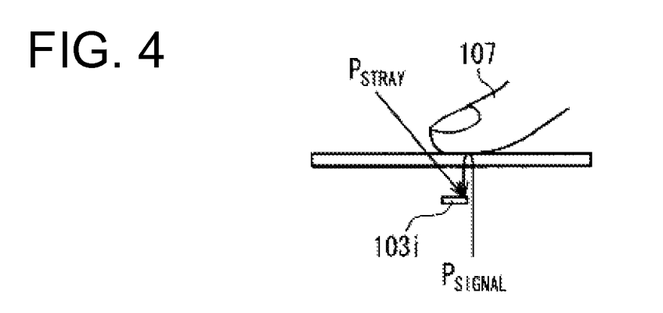
FIG. 4 is a schematic view showing examples of light to be detected and stray light when a display of a liquid crystal display device is configured as a touch panel.

FIG. 4 is a schematic view showing an example of the light to be detected and the stray light when a display of a liquid crystal display device is configured as a touch panel. In the example shown in FIG. 4, the light to be detected $P_{SIGNAL}$ is a component of the light emitted from the backlight, reflected by an object 107 (a finger, a touch pen, or the like) touching a surface 108 of the touch panel, and coming in to the intrinsic semiconductor region 103i of the photodiode D1. The light to be detected $P_{SIGNAL}$ is coming in from a substantially perpendicular direction with respect to the intrinsic semiconductor region 103i. In contrast, the stray light $P_{STRAY}$ is the light coming in at oblique angles toward the intrinsic semiconductor region 103i, such as external light or randomly reflected light.

In the optical sensor of the present embodiment, as shown in FIG. 3A, both the light to be detected $P_{SIGNAL}$ and the stray light $P_{STRAY}$ are coming in to the intrinsic semiconductor region 103i of the photodiode D1. In contrast, in the photodiode D2, by having the front light blocking film 106 on the front surface of the intrinsic semiconductor region 103i, the light to be detected $P_{SIGNAL}$ is blocked, and only the stray light $P_{STRAY}$ is coming in, as shown in FIG. 3B.

Figure 5:
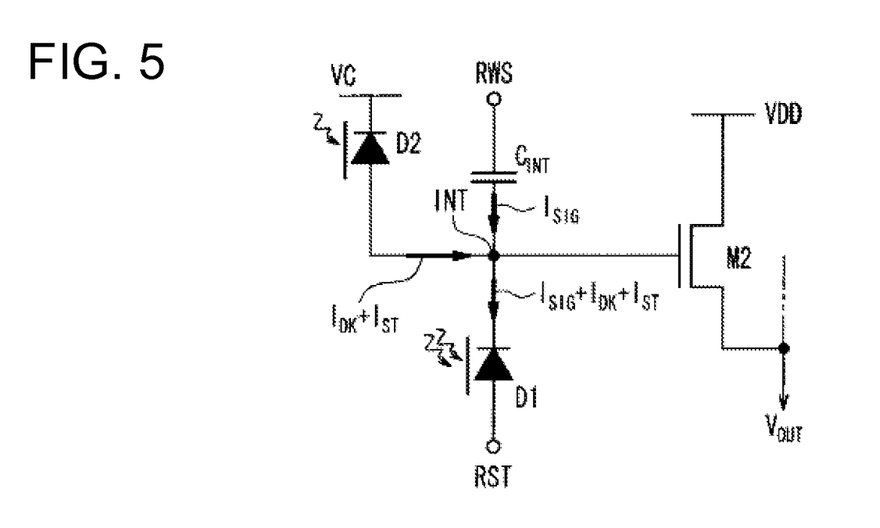
FIG. 5 is an equivalent circuit diagram showing the relationship of the currents flowing in the optical sensor according to Embodiment 1 of the present invention.

With this configuration, a relationship of the currents flowing in the optical sensor of the present embodiment is as shown in FIG. 5. In FIG. 5, $I_{SIG}$ is a photo current generated by the light to be detected $P_{SIGNAL}$. $I_{ST}$ is a photo current generated by the stray light $P_{STRAY}$. $I_{DK}$ is a dark current of the photodiodes. As shown in FIG. 5, a current corresponding to $I_{SIG}+I_{ST}+I_{DK}$ is flowing from an accumulation node INT into the photodiode D1. On the other hand, a current corresponding to $I_{ST}+I_{DK}$ is flowing from the photodiode D2 to the accumulation node INT. Therefore, only the component of the photo current $I_{SIG}$ generated by the light to be detected $P_{SIGNAL}$ constitutes the current flowing from the capacitor $C_{INT}$ to the accumulation node INT. As described above, in the optical sensor according to the present embodiment, both the component of the dark current $I_{DK}$ and the component of the photocurrent $I_{ST}$ by the stray light of the photodiodes are removed, and a sensor output generated by the genuine photo current $I_{SIG}$ can be obtained.

In the liquid crystal display device of the present embodiment having the optical sensor configured as above, as exemplarily shown in FIG. 2, the source line COLr doubles as a line VDD supplying a constant voltage $V_{DD}$ to the optical sensor from the sensor column driver 4. Also, the source line COLg doubles as a line OUT for the sensor output.

A line RST for supplying a reset signal is connected to the anode of the photodiode D1. The photodiode D1 and the photodiode D2 are connected to each other in series, and the gate of the thin film transistor M2 and one of the electrodes of the capacitor $C_{INT}$ are connected to between the cathode of the photodiode D1 and the anode of the photodiode D2. The cathode of the photodiode D2 is connected to the reference voltage line VC.

The drain of the thin film transistor M2 is connected to the line VDD, and the source is connected to the line OUT. The lines RST, RWS are connected to the sensor row driver 5. Since these lines RST, RWS are provided on each row, if it is necessary to differentiate these respective lines, then they are expressed as RSTi, RWSi (i=1-M).

The sensor row driver 5 sequentially selects a set of the lines RSTi and RWSi, as shown in FIG. 2, at a predetermined time interval ($t_{row}$). By this, a row of the optical sensors from which signal electric charges in the pixel region 1 are to be read out is sequentially selected.

Here, as shown in FIG. 2, the drain of a thin film transistor M3, which is an insulated gate type field effect transistor, is connected to an end of the line OUT. Also, an output line SOUT is connected to the drain of the thin film transistor M3, and a drain potential $V_{SOUT}$ of the thin film transistor M3 is outputted as the output signal from the optical sensor to the sensor column driver 4. The source of the thin film transistor M3 is connected to a line VSS. The gate of the thin film transistor M3 is connected to a reference voltage power supply (not shown) through a reference voltage line VB.

Figure 6:
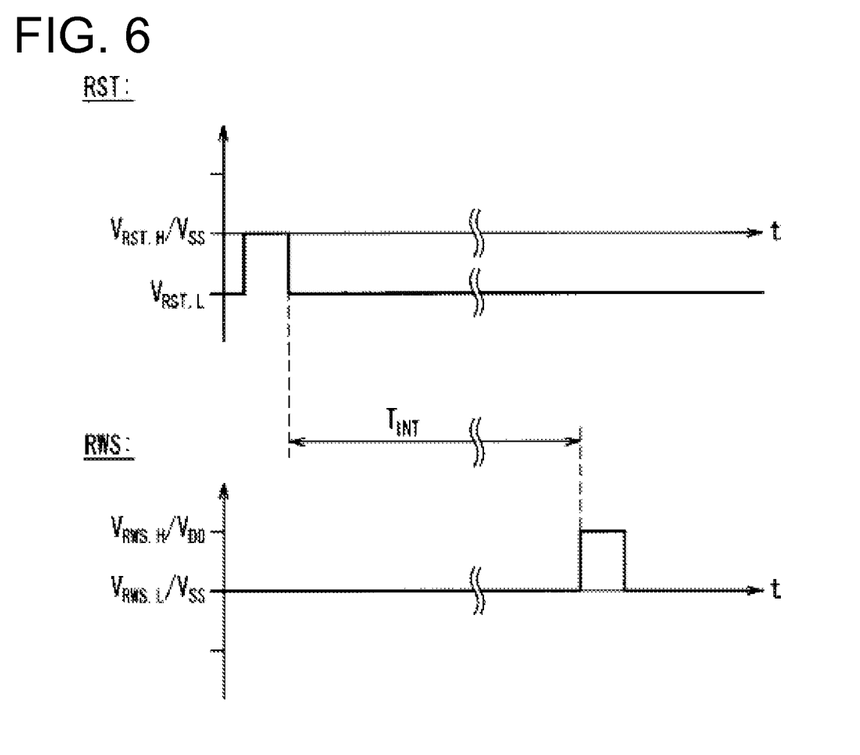
FIG. 6 is a timing chart showing respectively waveforms of the reset signal supplied from the line RST to the optical sensor and the read out signal supplied from the line RWS in the display device according to Embodiment 1 of the present invention.
Figure 7:
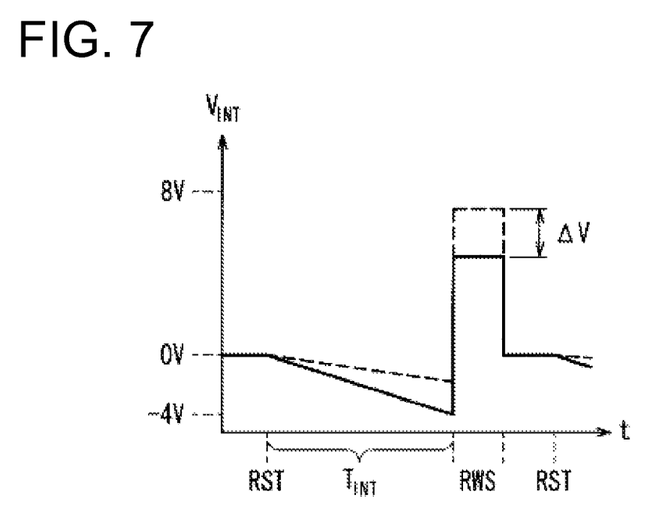
FIG. 7 is a waveform chart showing the relationship of the input signals (reset signal, read out signal) and $V_{INT}$ in the optical sensor according to Embodiment 1 of the present invention.

Here, referring to FIG. 6 and FIG. 7, operation of the optical sensor in the present embodiment is described. FIG. 6 is a timing chart showing respectively waveforms of the reset signal supplied to the optical sensor from the line RST and a read out signal supplied from the line RWS. FIG. 7 is a waveform chart showing the relationship of input signals (the reset signal, the read out signal) and $V_{INT}$ according to the optical sensor in Embodiment 1.

In the example shown in FIG. 6, the high level $V_{RST.H}$ of the reset signal is 0V, and the low level $V_{RST.L}$ is −4V. In this example, the high level $V_{RST.H}$ of the reset signal is equal to $V_{SS}$. Also, the high level $V_{RWS.H}$ of the read out signal is 8V, and the low level $V_{RWS.L}$ is 0V. In this example, the high level $V_{RWS.H}$ of the read out signal is equal to $V_{DD}$, and the low level $V_{RWS.L}$ is equal to $V_{SS}$.

Initially, when the reset signal supplied from the sensor row driver 5 to the line RST rises from the low level (−4V) to the high level (0V), the photodiode D1 becomes forward biased. At this time, since the potential $V_{INT}$ of the gate electrode of the thin film transistor M2 is lower than the threshold voltage of the thin film transistor M2, the thin film transistor M2 is non-conducting. Here, for the photodiode D2, the potential of the reference voltage line VC is set so that a reverse bias is always applied. Accordingly, the photodiode D2 is not forward biased even when the photodiode D1 is reset.

Next, an integration period (the period $T_{INT}$ in FIG. 7) of the photo current is started by the reset signal returning to the low level $V_{RST.L}$. During the integration period, the capacitor $C_{INT}$ is discharged by the current flowing out from the capacitor $C_{INT}$ by the photodiodes D1, D2. At this time, for the photodiode D1, as described above, the sum of the photo current $I_{SIG}$ generated by the light to be detected $P_{SIGNAL}$, the dark current $I_{DK}$, and the photo current $I_{ST}$ generated by the stray light $P_{STRAY}$ is flowing out of the capacitor $C_{INT}$. On the other hand, for the photodiode D2, the sum of the dark current $-I_{DK}$ and the photo current $-I_{ST}$ generated by the stray light $P_{STRAY}$ is flowing out of the capacitor $C_{INT}$. As a result, the current flowing into the accumulation node INT from the capacitor $C_{INT}$, is substantially the photo current $I_{SIG}$ only. Even during the integration period, since $V_{INT}$ is lower than the threshold voltage of the thin film transistor M2, the thin film transistor M2 is in a non-conducting state.

When the integration period ends, as shown in FIG. 6, a read out period is started by the rise of the read out signal. Here, an electric charge injection occurs at the capacitor $C_{INT}$. As a result, the voltage $V_{INT}$ of the gate electrode of the thin film transistor M2 becomes higher than the threshold voltage of the thin film transistor M2. Because of this, the thin film transistor M2 enters a conducting state, and functions as a source follower amplifier together with the thin film transistor M3, which is provided for a bias purpose at the end of the line OUT of each column. Therefore, an output signal voltage at the output line SOUT from the drain of the thin film transistor M3 corresponds to the integrated photo current $I_{SIG}$ in accordance with the light to be detected $P_{SIGNAL}$ that have entered the photodiode D1 during the integration period.

Here, in FIG. 7, the waveform shown by broken lines show a change in the voltage $V_{INT}$ when the incoming amount of light to be detected $P_{SIGNAL}$ to the photodiode D1 is small, and the waveform shown by solid lines show a change in the voltage $V_{INT}$ when the incoming amount of light to be detected $P_{SIGNAL}$ to the photodiode D1 is large. $\Delta V$ in FIG. 7 is the voltage difference proportional to the integration amount of the photo current $I_{SIG}$ from the photodiode D1.

As described above, by periodically performing initialization by the reset pulse, integration of the photo current in the integration period, and read out of the sensor output in the read out period, an optical sensor output for each of the pixels can be obtained.

As described above, the optical sensor provided in each pixel of the display device of the present embodiment charges and discharges the capacitor $C_{INT}$ only by the photo current component $I_{SIG}$ of the light to be detected $P_{SIGNAL}$ coming into the photodiode D1. Therefore, the intensity of the light to be detected can be accurately detected regardless of the sizes of the dark current $I_{DK}$ and the photo current $I_{ST}$ generated by the stray light $P_{STRAY}$. Also, since the dark current $I_{DK}$ and the photo current $I_{ST}$ generated by the stray light $P_{STRAY}$ are not discharged from the capacitor $C_{INT}$, the dynamic range can be made wide. Therefore, the optical sensor, which can detect the intensity of the light to be detected with high accuracy without being influenced by changes in the ambient temperature or the stray light, can be realized.

Figure 8:
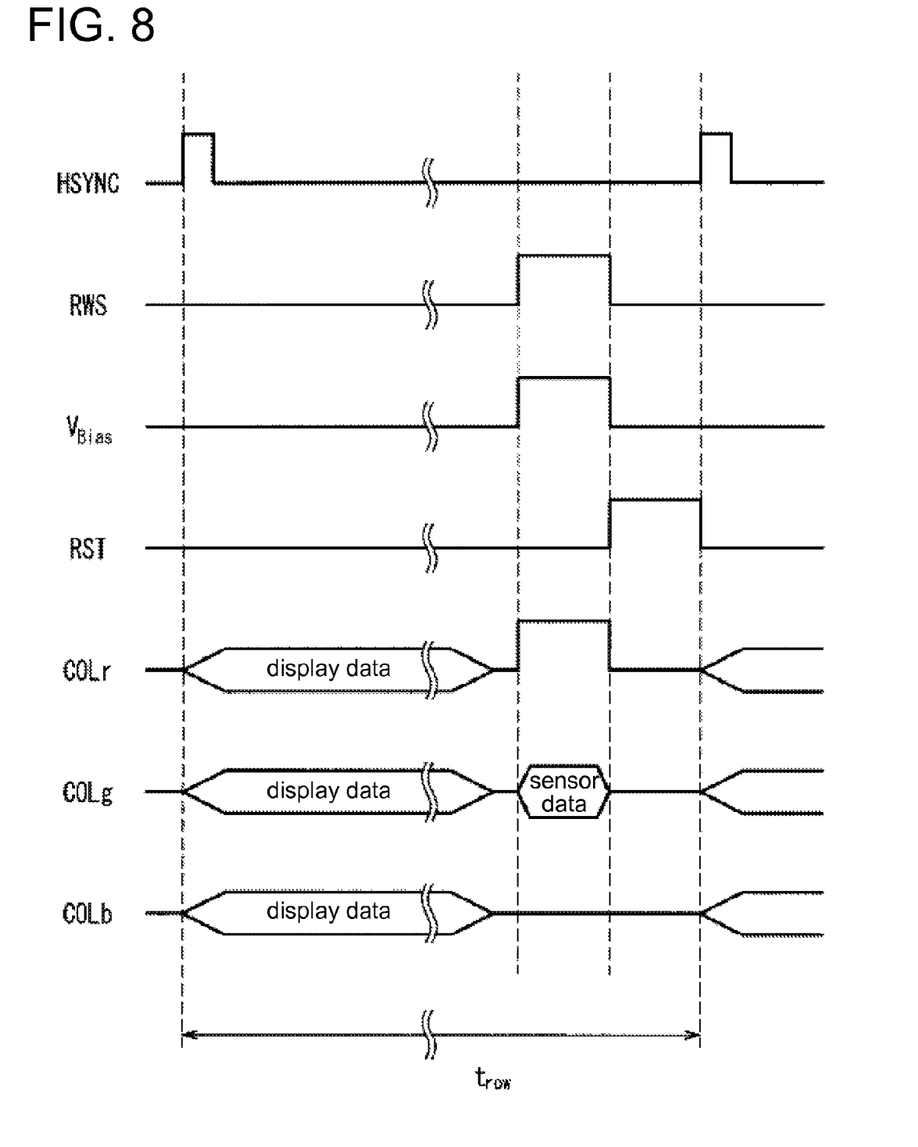
FIG. 8 is a timing chart showing the timing for driving the sensor in the display device according to Embodiment 1.

Here, in the present embodiment, as described before, the source lines COLr, COLg double as the photo sensor lines VDD, OUT. Therefore, as shown in FIG. 8, the timing for inputting an image data signal for display through the source lines COLr, COLg, COLb, and the timing for reading out the sensor output need to be differentiated. In the example as shown in FIG. 8, after inputting the image data signal for display in a horizontal scan period, the sensor output is read out using a horizontal blanking period or the like. That is, after inputting the image data signal for display, the constant voltage $V_{DD}$ is applied to the source line COLr. Here, HSYNC in FIG. 8 shows a horizontal synchronizing signal.

As shown in FIG. 1, the sensor column driver 4 has a sensor pixel read out circuit 41, a sensor column amplifier 42, and a sensor column scan circuit 43. The output line SOUT (see FIG. 2) outputting the sensor output $V_{SOUT}$ from the pixel region 1 is connected to the sensor pixel read out circuit 41. In FIG. 1, the sensor output outputted by the output line SOUTj (j=1-N) is expressed as $V_{SOUTj}$. The sensor pixel read out circuit 41 outputs a peak hold voltage $V_{Sj}$ of the sensor output $V_{SOUTj}$ to the sensor column amplifier 42. The sensor column amplifier 42 includes N column amplifiers corresponding to the optical sensors in N columns of the pixel region 1, respectively, and the respective column amplifiers amplify the peak hold voltages $V_{Sj}$ (j=1-N), and output them to the buffer amplifier 6 as $V_{COUT}$. The sensor column scan circuit 43 outputs column select signals $CS_j$ (j=1-N) to the sensor column amplifier 42, in order to sequentially connect the column amplifiers of the sensor column amplifier 42 to the output to the buffer amplifier 6.

Figure 9:
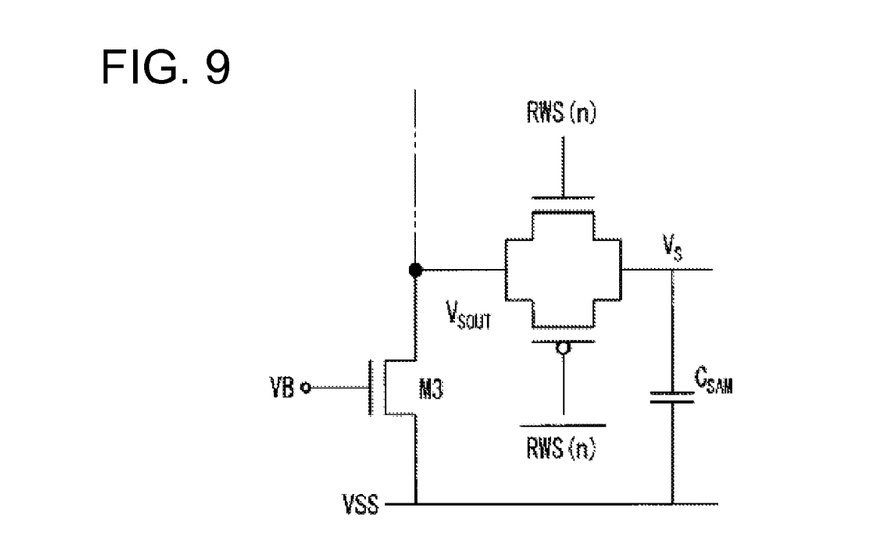
FIG. 9 is a circuit diagram showing an internal configuration of a sensor pixel read out circuit.
Figure 10:
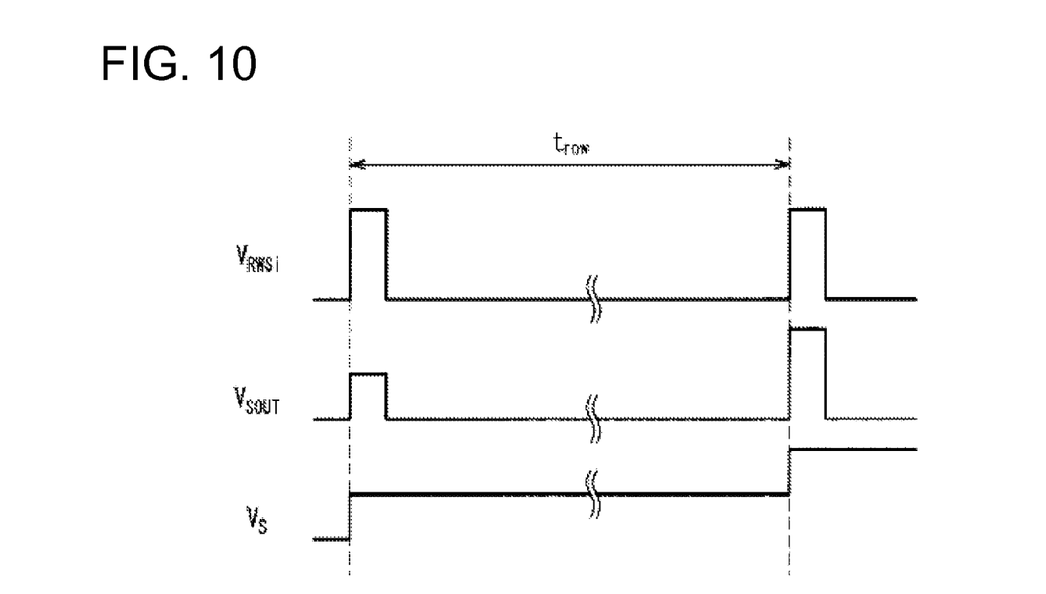
FIG. 10 is a waveform chart showing a relationship of a read out signal, a sensor output, and an output of a sensor pixel read out circuit.

Here, referring to FIG. 9 and FIG. 10, operations of the sensor column driver 4 and the buffer amplifier 6 after the sensor output $V_{SOUT}$ is read out from the pixel region 1 are described. FIG. 9 is a circuit diagram showing an internal configuration of the sensor pixel read out circuit 41. FIG. 10 is a waveform chart showing a relationship among the read out signal, the sensor output, and the output of the sensor pixel read out circuit. As described before, when the read out signal becomes the high level $V_{RWS.H}$, the thin film transistor M2 conducts and thus, the source follower amplifier is formed by the thin film transistors M2, M3, and the sensor output $V_{SOUT}$ is accumulated in a sample capacitor $C_{SAM}$ of the sensor pixel read out circuit 41. Because of this, even after the read out signal becomes the low level $V_{RWS.L}$, an output voltage $V_S$ to the sensor column amplifier 42 from the sensor pixel read out circuit 41 is maintained at a level equal to the peak value of the sensor output $V_{SOUT}$ during a select period ($t_{row}$) of that row, as shown in FIG. 10.

Figure 11:
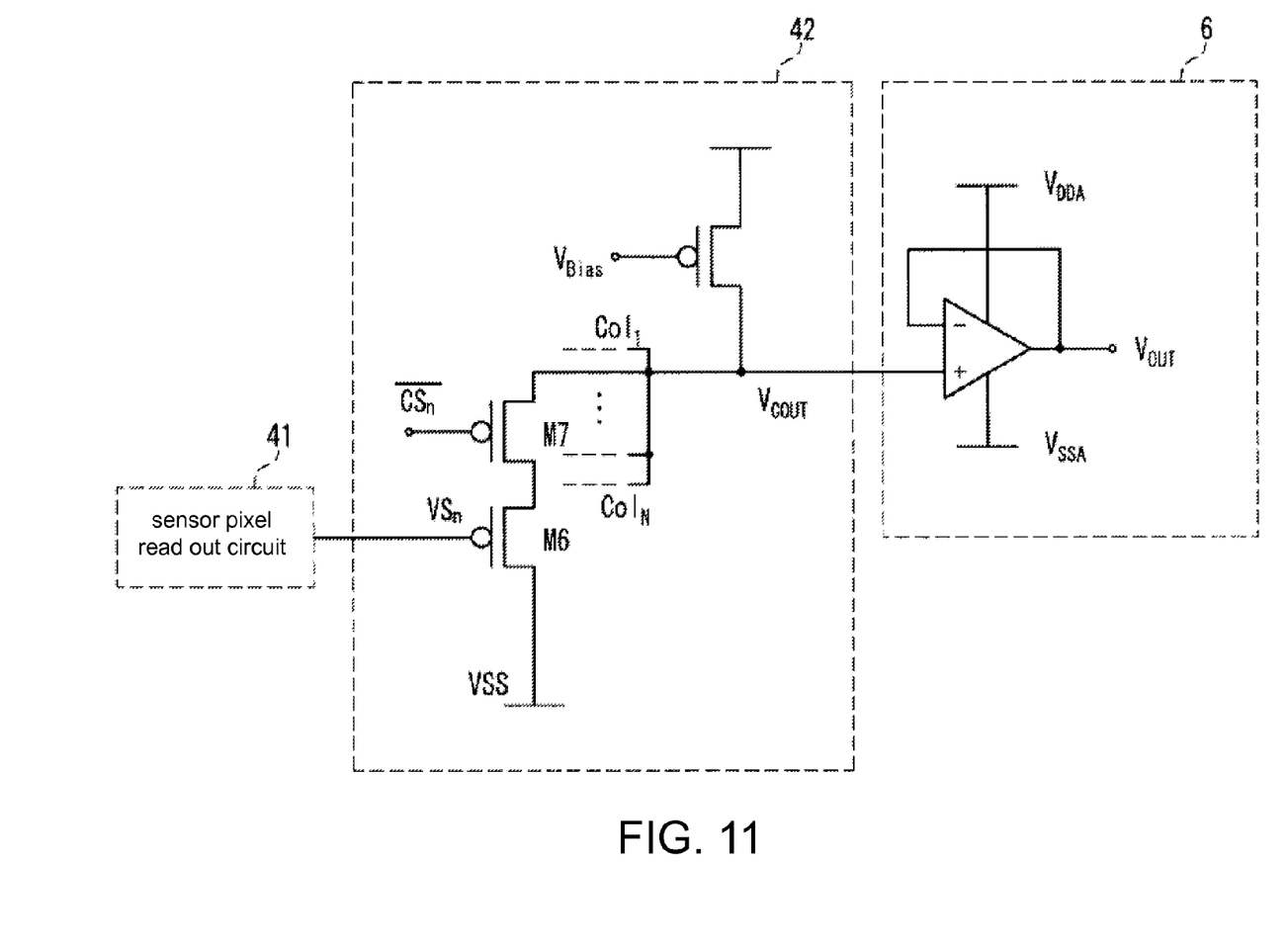
FIG. 11 is a circuit diagram showing a configuration example of a sensor column amplifier.

Next, operation of the sensor column amplifier 42 is described with reference to FIG. 11. As shown in FIG. 11, from the sensor pixel read out circuit 41, the output voltages $V_{Sj}$ (j=1-N) of respective columns are inputted to the N column amplifiers of the sensor column amplifier 42. As shown in FIG. 11, each column amplifier is constituted by thin film transistors M6, M7. Since the column select signals $CS_j$ generated by the sensor column scan circuit 43 become sequentially ON for the respective N columns during one row selection period ($t_{row}$), the thin film transistor M6 in only one of the N column amplifiers of the sensor column amplifier 42 becomes ON, and through this thin film transistor M6, only one of the output voltages $V_{Sj}$ (j=1-N) of the respective columns is outputted as the output $V_{COUT}$ from the sensor column amplifier 42. The buffer amplifier 6 further amplifies the output $V_{COUT}$ outputted from the sensor column amplifier 42, and outputs it as a panel output (optical sensor signal) $V_{out}$ to the signal processing circuit 8.

Here, as described above, the sensor column scan circuit 43 may scan columns of optical sensors column by column in a scanning manner. However, the present embodiment is not limited to this. It may be configured so that the optical sensor columns are scanned in an interlaced manner. Also, the sensor column scan circuit 43 may be formed as a drive scan circuit of multiple phases, such as four phases or the like, for example.

With the above configuration, the display device of the present embodiment obtains the panel output $V_{OUT}$ corresponding to the received amount of light to be detected in the photodiode D1 formed in each of the pixels in the pixel region 1. The panel output Vout is sent to the signal processing circuit 8, A/D converted, and is accumulated in a memory (not shown) as panel output data. In other words, the number of the panel output data accumulated in this memory is the same as the number of pixels (the number of the optical sensors) in the pixel region 1. In the signal processing circuit 8, various signal processings, such as image capturing, detection of touch region, and the like, are performed using the panel output data accumulated in the memory. Here, in the present embodiment, the number of panel output data accumulated in the memory of the signal processing circuit 8 is the same as the number of pixels (the number of the optical sensors) in the pixel region 1. However, depending on the constraint of a memory capacity and the like, it is not necessarily to accumulate the same number of panel output data as the number of pixels.

Embodiment 2

Embodiment 2 of the present invention is described below. Here, the same reference characters are assigned to the structures that have functions similar to those described above in Embodiment 1, and their detailed description is omitted.

Figure 12:
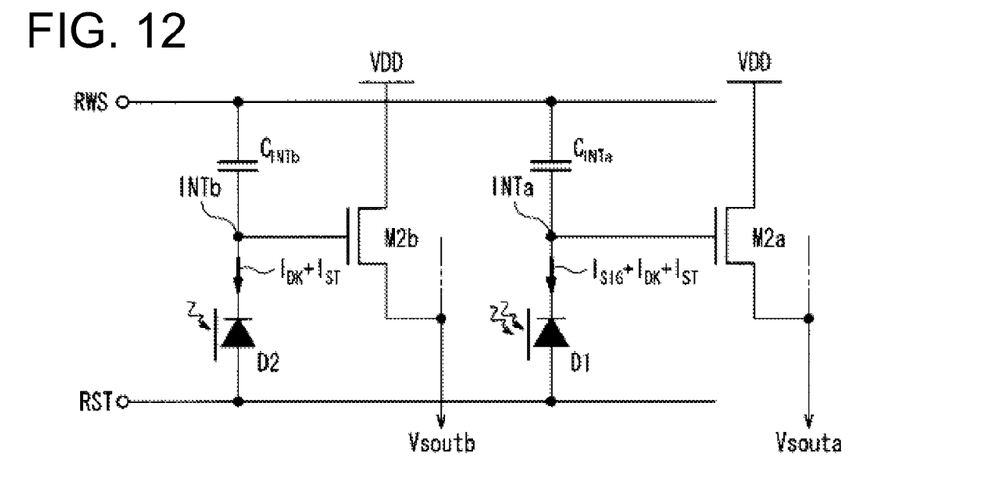
FIG. 12 is an equivalent circuit diagram of an optical sensor provided in a display device according to Embodiment 2 of the present invention.

FIG. 12 is an equivalent circuit diagram of an optical sensor provided in a display device of Embodiment 2. As shown in FIG. 12, the optical sensor in the present embodiment is different from Embodiment 1 in that accumulation capacitors $C_{INTa}$, $C_{INTb}$ and thin film transistors M2a, M2b are provided to a photodiode D1 for detecting light and to a photodiode D2 for reference, respectively. Structures of the photodiodes D1, D2 are as shown in FIG. 3A and FIG. 3B of Embodiment 1.

One of the electrodes of the accumulation capacitor $C_{INTa}$, and the gate electrode of the thin film transistor M2a are connected to the cathode of the photodiode D1. The other electrode of the capacitor $C_{INTa}$ is connected to a line RWS supplying a read out signal.

One of the electrodes of the accumulation capacitor $C_{INTb}$ and the gate electrode of the thin film transistor M2b are connected to the cathode of the photodiode D2. The other electrode of the capacitor $C_{INTb}$ is connected to the line RWS supplying the read out signal.

In the optical sensor according to the above configuration, a voltage $V_{souta}$ corresponding to the sum of the photo current $I_{SIG}$ generated by the light to be detected $P_{SIGNAL}$, the dark current $I_{DK}$ and the photo current $I_{ST}$ generated by the stray light $P_{STRAY}$ is outputted from the thin film transistor M2a connected to the photodiode D1. On the other hand, a voltage $V_{soutb}$ corresponding to the sum of the dark current $I_{DK}$ and the photo current $I_{ST}$ generated by the stray light $P_{STRAY}$ is outputted from the thin film transistor M2b connected to the photodiode D2. Accordingly, by subtracting the $V_{soutb}$ from the $V_{souta}$, a sensor output corresponding to the photo current $I_{SIG}$ generated by the light to be detected $P_{SIGNAL}$ is obtained. Here, the process of subtracting the $V_{soutb}$ from the $V_{souta}$ may be performed in the sensor column driver 4 or in the signal processing circuit 8.

Embodiment 3

A display device according to Embodiment 3 of the present invention is described below. Here, the same reference characters are assigned to the structures that have functions similar to those described above in Embodiment 1 and Embodiment 2, and their detailed description is omitted.

Figure 13A:
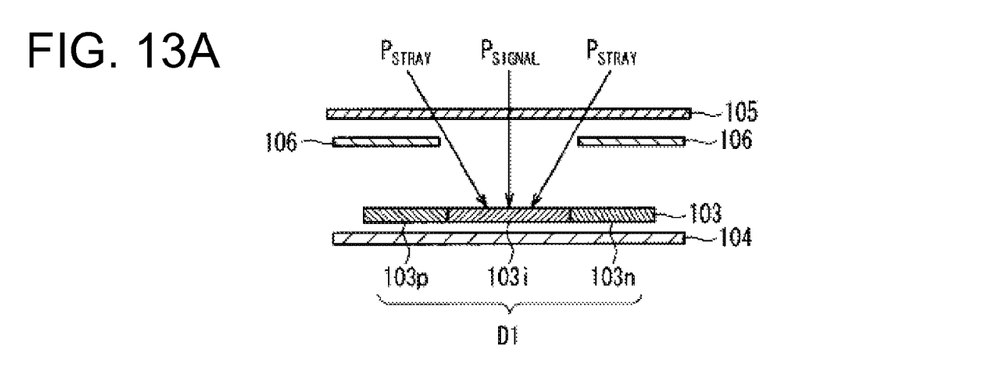
FIG. 13A is a schematic cross sectional view showing a schematic configuration of a photodiode for detecting light and the condition of incoming light according to Embodiment 3.
Figure 13B:
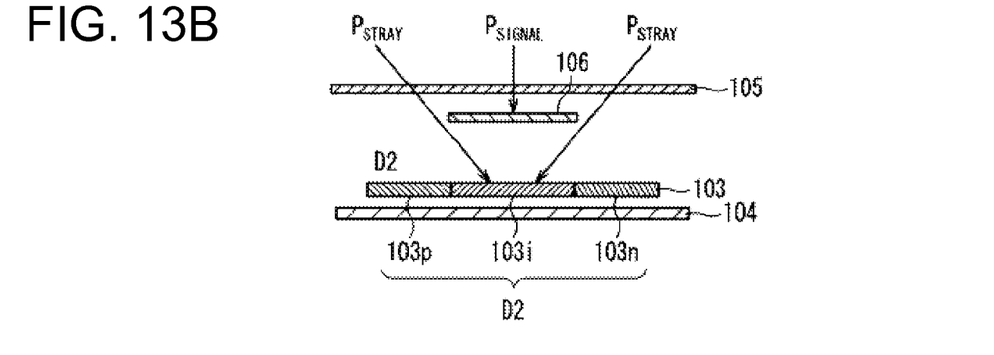
FIG. 13B is a schematic cross sectional view showing a schematic configuration of a photodiode for reference and the condition of incoming light according to Embodiment 3.

FIG. 13A is a schematic cross sectional view showing a configuration of a photodiode for detecting light and a condition of incoming light in Embodiment 3. FIG. 13B is a schematic cross sectional view showing a configuration of a photodiode for reference and a condition of incoming light in Embodiment 3.

As shown in FIG. 13A, the optical sensor according to the present embodiment is different from Embodiment 1 and Embodiment 2 in that a front light blocking film 106 is provided also in a front surface (the side the light to be detected is coming in) of a photodiode D1 for detecting light. As shown in FIG. 13B, for a photodiode D2 and its front light blocking film 106, structures are the same as those of Embodiments 1 and 2, as shown in FIG. 3B.

As shown in FIG. 13A, the front light blocking film 106 provided in the front surface of the photodiode D1 is patterned so as to cover an n type semiconductor region 103n and a p type semiconductor region 103p of the photodiode D1, and to expose an intrinsic semiconductor region 103i. Here, the front light blocking film 106 in FIG. 13A can be formed of the same materials, by the same manufacturing steps, and at the same time as the front light blocking film 106 in FIG. 13B. Here, in the configuration shown in FIG. 13A also, the stray light $P_{STRAY}$ enters the intrinsic semiconductor region 103i.

Figure 14:
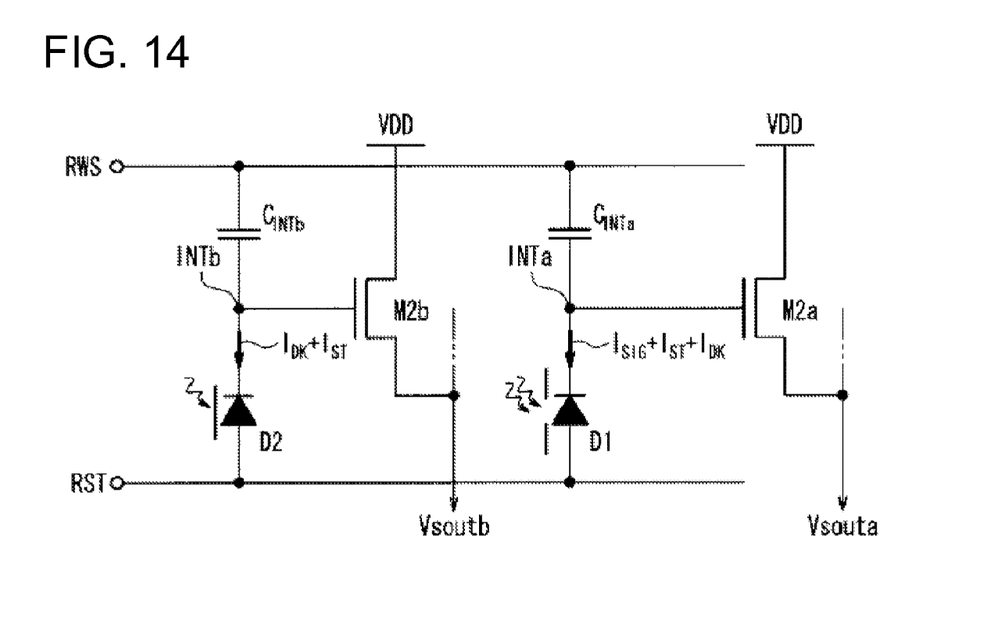
FIG. 14 is an equivalent circuit diagram showing an optical sensor provided in the display device according to Embodiment 3.

FIG. 14 is an equivalent circuit diagram of the optical sensor of the present embodiment. As shown in FIG. 14, one of the electrodes of an accumulation capacitor $C_{INTa}$ and the gate electrode of a thin film transistor M2a are connected to the cathode of the photodiode D1. The other electrode of the capacitor $C_{INTa}$ is connected to a line RWS that supplies a read out signal. One of the electrodes of an accumulation capacitor $C_{INTb}$ and the gate electrode of a thin film transistor M2b are connected to the cathode of the photodiode D2. The other electrode of the capacitor $C_{INTb}$ is connected to the line RWS that supplies the read out signal.

In the optical sensor according to the above configuration, a voltage $V_{souta}$ corresponding to the sum of the photo current $I_{SIG}$ generated by the light to be detected $P_{SIGNAL}$, the photo current $I_{ST}$ generated by the stray light $P_{STRAY}$, and the dark current $I_{DK}$ is outputted from the thin film transistor M2a connected to the photodiode D1. On the other hand, a voltage $V_{soutb}$ corresponding to the sum of the dark current $I_{DK}$ and the photo current $I_{ST}$ generated by the stray light $P_{STRAY}$ is outputted from the thin film transistor M2b connected to the photodiode D2. Accordingly, by subtracting the $V_{soutb}$ from the $V_{souta}$, a sensor output corresponding only to the photo current $I_{SIG}$ generated by the light to be detected $P_{SIGNAL}$ is obtained.

Figure 15:
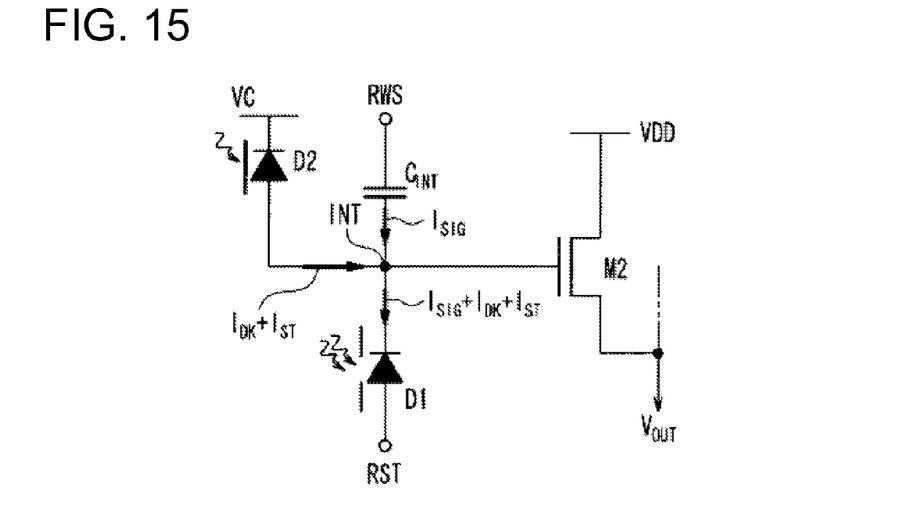
FIG. 15 is an equivalent circuit diagram showing an example of variations of the optical sensor provided in the display device according to Embodiment 3.

Here, in the above description, the configuration in which the photodiodes D1, D2 are connected in parallel, and the differential between their outputs is outputted as the sensor output has been shown as an example. However, similar to the configuration described in Embodiment 1, as shown in FIG. 15, a configuration in which the photodiodes D1, D2 are connected to each other in series, and the potential of their connection point is the sensor output is also possible.

Here, if the configuration of FIG. 3A of Embodiment 1 is compared with the configuration of FIG. 13A of Embodiment 3, when the distance between the photodiode D1 and the front light blocking film 106 is large, the configuration of FIG. 3A of Embodiment 1 is more effective for removing the stray light component. For example, in the case that a black matrix provided on the opposite substrate is used as the front light blocking film 106, or in like cases, the configuration of FIG. 3A can achieve more effective results than the configuration of FIG. 13A. In contrast, if the distance between the photodiode D1 and the front light blocking film 106 is small, the configuration of FIG. 13A of Embodiment 3 is more effective. For example, in the case that any of light blocking layers provided on the active matrix substrate 100 (for example, a reflective metallic layer or the like formed on an active matrix substrate in the case of a reflective type or semi-transmissive type liquid crystal display device, or the like) is utilized as the front light blocking film 106, the configuration of FIG. 13A can achieve more effective results than the configuration of FIG. 3A.

Also, when the two sensor outputs ($V_{souta}$, $V_{soutb}$) are subtracted in the manner shown in FIG. 14A, the configuration of FIG. 13A described in the present embodiment is preferable as the photodiode D1 for detecting light. The reason for this is that the amount of light coming into the photodiode D1 becomes small, and the sensor output becomes unlikely to saturate.

Embodiment 4

A display device according to Embodiment 4 of the present invention is described below. Here, the same reference characters are assigned to the structures that have functions similar to those described above in Embodiment 1 through Embodiment 3, and their detailed description is omitted.

In Embodiments 1 through 3, the configurations having the optical sensor inside the pixel region 1 of the active matrix substrate 100 are shown as an example. In contrast, in the present embodiment, a display device having an optical sensor outside of a pixel region 1 is shown as an example.

Figure 16:
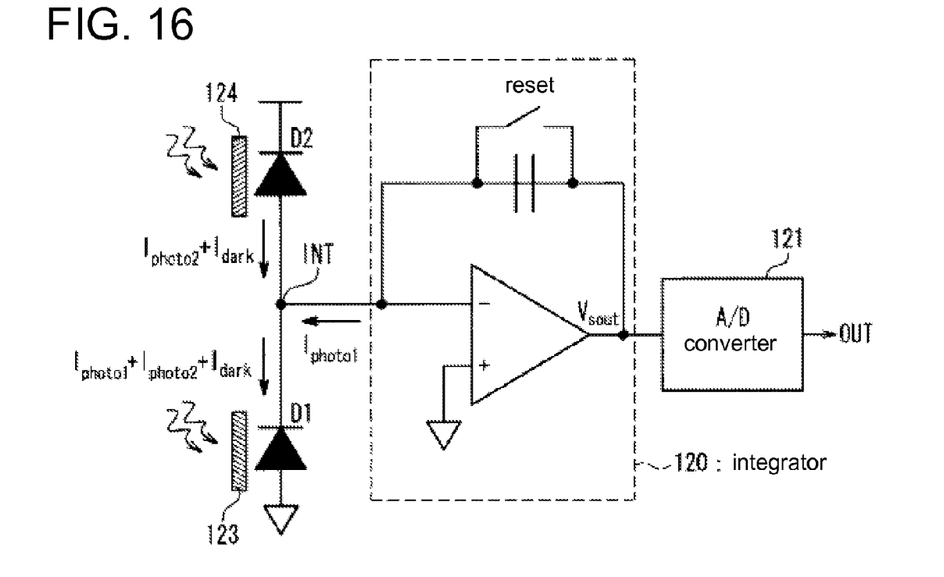
FIG. 16 is a circuit diagram showing a schematic configuration of an optical sensor according to Embodiment 4.

FIG. 16 is a circuit diagram showing a configuration of the optical sensor according to Embodiment 4. This optical sensor is formed outside of the pixel region 1, for example, in a frame region of an active matrix substrate 100 or the like.

As shown in FIG. 16, the optical sensor of the present embodiment has a photodiode D1 for detecting light, a diode D2 for reference, an integrator 120, and an A/D converter 121. The photodiodes D1, D2 may be diodes formed by a semiconductor process, such as the PIN diodes that have been described in Embodiments 1 through 3, for example, or may be discrete photodiode components mounted on the active matrix substrate 100 by COG or the like.

A green color filter 123 is provided on a front surface (the side the light to be detected is coming in) of the photodiode D1. A color filter 124 formed by laminating two layers of filters of red and blue is provided on a front surface of the photodiode D2. The integrator 120, as shown in FIG. 16, integrates a current flowing into an accumulation node INT during a predetermined period after being reset, and an obtained voltage $V_{sout}$ is outputted to the A/D converter 121. The A/D converter 121 converts the voltage $V_{sout}$ to digital data and outputs it.

Figure 17:
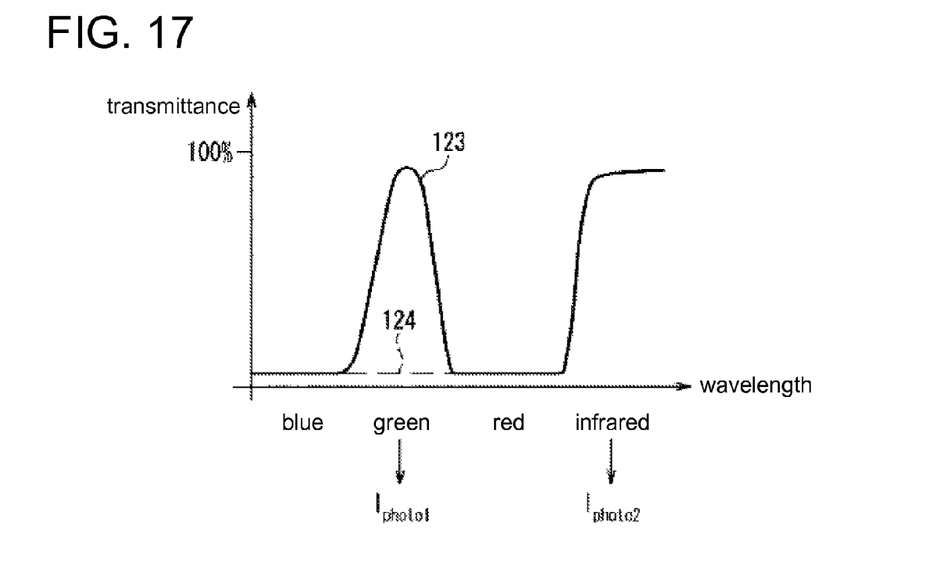
FIG. 17 is a characteristic curve graph showing optical characteristics of color filters 123, 124.

FIG. 17 is a characteristic curve graph showing optical characteristics of the color filters 123, 124. In FIG. 17, a curve L123 shown by a solid line is a characteristic curve of the color filter 123 of blue, and a curve L124 shown by a broken line is a characteristic curve of the color filter 124. The color filter 123 has a characteristic of selectively transmitting light in a green wavelength range (near 568 nm) of the visible light range. However, light in an infrared wavelength range is also transmitted. The color filter 124 has a characteristic of selectively transmitting light in the infrared wavelength range.

By disposing the color filter 123 having these optical characteristics on the front surface of the photodiode D1, as shown in FIG. 16, the current of $-(I_{photo1}+I_{photo2}+I_{DK})$ flows into the accumulation node INT from the photodiode D1. Here, $I_{photo1}$ shown in FIG. 17 is a photo current generated by the photodiode due to light in the green wavelength range, and $I_{photo2}$ is a photo current generated by light in the infrared wavelength range. Also, $I_{DK}$ is a dark current of the photodiode. Also by disposing the color filter 124 on the front surface of the photodiode D2, the current of $(I_{photo2}+I_{DK})$ flows into the accumulation node INT from the photodiode D2. Accordingly, the sum of the currents flowing into the accumulation node INT from the photodiodes D1, D2 is $I_{photo1}$. By this, a sensor output corresponding to the photo current $I_{photo1}$ at the photodiode generated by light in the green wavelength range that depends of the amount of the light received can be obtained.

Light in the green wavelength range is most highly discernable to the human eyes. Accordingly, in the present embodiment, an optical sensor that detects with high accuracy light in this wavelength range as light to be detected can be realized. Here, in the present embodiment, a specific example using the optical sensor provided outside of the pixel region 1 is described. However, the configuration of providing the color filters 123, 124 in the photodiode D1 for detecting light and in the photodiode D2 for reference, respectively, can be applied to the optical sensor provided inside the pixel, such as those described in Embodiments 1 through 3.

Embodiments 1 through 4 of the present invention are described above. However, the present invention is not limited to these respective embodiments described above. Many modifications within the scope of the invention are possible.

For example, in the above embodiments, a configuration in which the lines VDD and OUT double as the source lines COL is shown as an example. This configuration has an advantage of having a high pixel aperture ratio. However, in this configuration, since these lines for the optical sensor double as the source lines COL, sensor circuit output data cannot be read out while the image signals for pixel display are applied to the source lines COL. Because of this, as shown in FIG. 8, the read out signal for the sensor circuit output data needs to be applied during the flyback period. In light of the above, the lines VDD and OUT for the optical sensor may be provided separately from the source lines COL. With this configuration, the pixel aperture ratio becomes low. However, because these lines for the optical sensor can be driven separately from the source lines COL, there is an advantage that the sensor circuit output data can be read out regardless of the pixel display timing.

Also, in Embodiments 1 through 3 as described above, the sensor circuits having the capacitor $C_{INT}$ as the accumulation capacitance are shown as examples. However, even in the absence of a circuit element corresponding to the accumulation capacitance in the sensor circuit, a parasitic capacitance generated naturally to the accumulation node can be used as the accumulation capacitance. Accordingly, the capacitor $C_{INT}$ may not be needed.

INDUSTRIAL APPLICABILITY

The present invention can be used in industries as an optical sensor and as a display device having the same.

DESCRIPTION OF REFERENCE CHARACTERS

1 pixel region
2 display gate driver
3 display source driver
4 sensor column driver
41 sensor pixel read out circuit
42 sensor column amplifier
43 sensor column scan circuit
44 analog switch
5 sensor row driver
6 buffer amplifier
7 FPC connector
8 signal processing circuit
9 FPC
100 active matrix substrate
103 silicon film
103$p$ p type semiconductor region
103$i$ intrinsic semiconductor region
103$n$ n type semiconductor region
104 rear light blocking film
105 infrared removal filter
106 front light blocking film

The invention claimed is:

1. An optical sensor for selectively detecting light that is incident on the optical sensor along directions that are substantially parallel to a predetermined direction, comprising:
    a first light detecting element;
    a second light detecting element adjacent to the first light detecting element; and
    a light blocking layer disposed in an incident light path to the second light detecting element, the light blocking layer preventing said light that is incident along directions that are substantially parallel to the predetermined direction from entering into a light detection region of the second light detecting element, the light blocking layer not blocking substantially all other light, allowing such light to entering into the light detection region;
    a circuitry outputting either a differential between an output from the first light detecting element and an output from the second light detecting element as a sensor output, or said respective outputs from the first and second light detecting elements so that the differential as the sensor output can be calculated by subtraction.

2. The optical sensor according to claim 1, further comprising another light blocking layer in an incident light path to the first light detecting element, said another light blocking layer selectively exposing a light detecting region of the first light detecting element.

3. The optical sensor according to claim 1, wherein the predetermined direction is normal to the optical sensor.

4. The optical sensor according to claim 1, further comprising:
    a green filter disposed in an incident light path to the first light detecting element; and
    an infrared transmission filter disposed in an incident light path to the second light detecting element.

5. The optical sensor according to claim 1, wherein the first light detecting element is connected to the second light detecting element in series, and a potential at a connection point thereof is outputted as a sensor output.

6. The optical sensor according to claim 1, wherein the first light detecting element is connected to the second light detecting element in parallel, and
    wherein said circuitry includes a circuit that finds a differential between an output from the first light detecting element and an output from the second light detecting element.

7. A display device comprising the optical sensor according to claim 1.

8. The display device according to claim 7, further comprising an active matrix substrate having a plurality of pixels formed thereon, wherein the optical sensor is provided in a region in which the pixels are formed on the active matrix substrate.

9. The display device according to claim 7, further comprising an active matrix substrate having a plurality of pixels formed thereon, wherein the optical sensor is provided outside of a region in which the pixels are formed on the active matrix substrate.

10. The display device according to claim 8, further comprising:
- an opposite substrate facing the active matrix substrate; and
- liquid crystal sandwiched between the active matrix substrate and the opposite substrate.

* * * * *